W. H. COMPTON.
LOADING DEVICE.
APPLICATION FILED JULY 29, 1916.
1,245,875.
Patented Nov. 6, 1917.
2 SHEETS—SHEET 1.
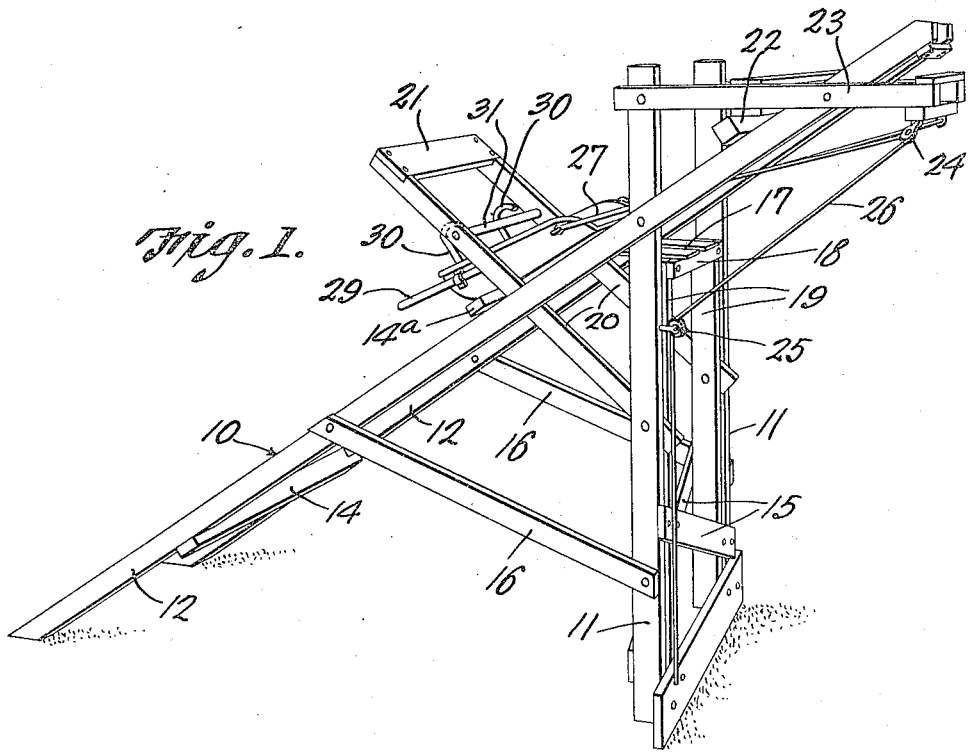
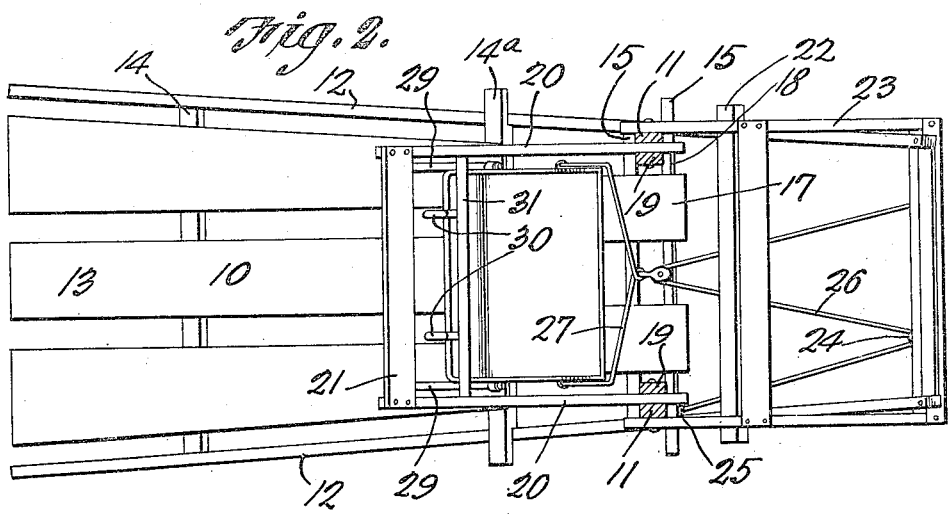
Witnesses
W. H. Compton, Inventor
by ——— Attorneys

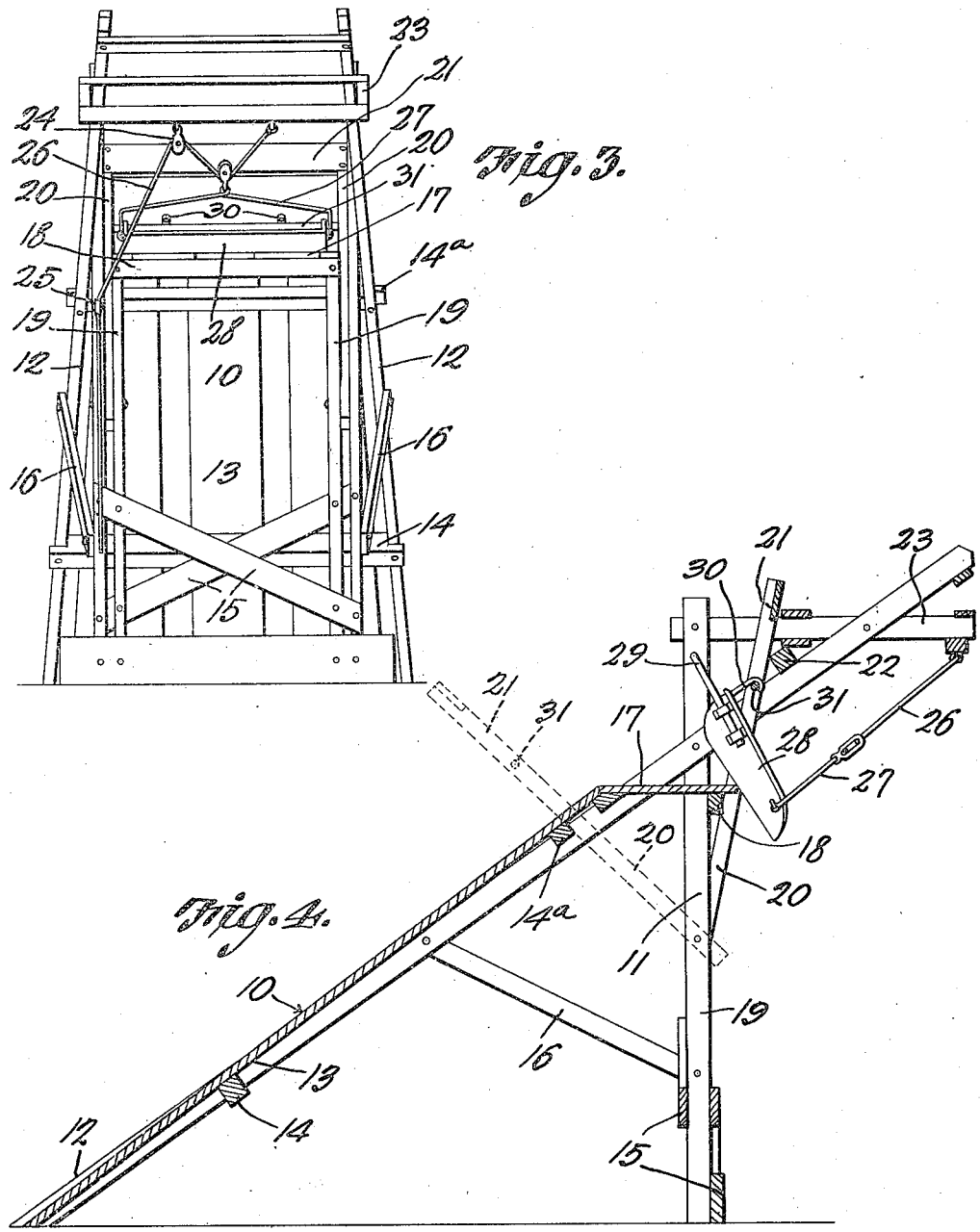

UNITED STATES PATENT OFFICE.

WILLIAM H. COMPTON, OF INDIANAPOLIS, INDIANA.

LOADING DEVICE.

1,245,875.　　　　　Specification of Letters Patent.　　　Patented Nov. 6, 1917.

Application filed July 29, 1916. Serial No. 112,101.

*To all whom it may concern:*

Be it known that I, WILLIAM H. COMPTON, a citizen of the United States, residing at Indianapolis, in the county of Marion and State of Indiana, have invented a new and useful Loading Device, of which the following is a specification.

The object of the invention is to provide a simple and convenient loading device wherein the discharge of the contents of the carrier or scoop is accomplished automatically or without active manipulation on the part of the operator or attendant, the supporting frame and guiding means being such as to permit of readily moving the apparatus to the desired point of use.

Further objects of the invention will appear as the description proceeds, it being understood that changes in the precise embodiment of the invention herein disclosed, can be made within the scope of what is claimed, without departing from the spirit of the invention.

In the accompanying drawings:—

Figure 1 is a perspective view of a loading device constructed in accordance with the present invention.

Fig. 2 is a plan view of the same.

Fig. 3 is a front view.

Fig. 4 is a vertical longitudinal section showing the carrier or scoop in the dumping position.

The inclined guide or runway 10 of which the lower end may rest upon the ground or any other surface and of which the upper end is supported by uprights 11, preferably consists of side bars 12 divergently disposed toward their lower ends, and a bottom or runway surface 13 held in place by cross bars or timbers 14, and depressed sufficiently below the upper edges of the side bars 12 to permit the latter to serve as lateral guards.

Suitable transverse braces 15 may be arranged to connect the uprights, and transverse braces 16 may be employed to connect said uprights with the side bars of the guide or runway.

Formed as an extension of the runway is a platform 17 extending rearwardly from and preferably slightly beyond the vertical plane of the uprights 11 and supported at its extremity by a cross bar 18 connecting the upper extremities of keeper bars 19 which are spaced inwardly from the inner surfaces of the uprights 11 to form guide spaces in which the arms 20 of a tilting frame 21 operate. In its normal position this tilting frame is supported against a stop bar $14^a$ constituting one of the transverse braces of the guide or runway, and at the limit of its forward movement said tilting frame is checked by contact with a stop bar 22 arranged on the crane arm 23 to which the side bars of the guide or runway near their upper extremities are secured. The bottom 13 of the run way has its upper end terminating between the stop bars $14^a$ and 22.

Extending through a block 24 or suitable guide on the crane structure consisting of the arm 23 and also preferably through a suitable guide 25 on one of the uprights or other suitable portion of the structure, is a cable 26, one extremity of which is connected to the bail 27 of a carrier or scoop 28. This carrier or scoop is provided with suitable handles 29 to serve as means to permit the operator to properly guide the same in its movement, under the tension of the cable 26, toward the guide or runway, and after the nose or front end of the carrier or scoop comes in contact with the guide or runway between the lower extremities of the side bars 12 thereof, said side bars at their lower ends being spaced apart a distance greater than the width of the front end of the carrier or scoop, the further tension upon the cable serves to cause the carrier or scoop to travel upwardly on the surface of the guide or runway until hooks or other hangers 30 on the carrier or scoop come in contact with a transverse rung or bar 31 on the tilting frame. Thereupon the further strain upon the cable will cause the carrier or scoop to move forward upon the platform 17 until tilted by the frame 21 sufficiently to permit of the discharge of the contents thereof into a suitable waiting receptacle or vehicle. Attention is directed to the fact that the platform 17 extends rearwardly from the upper end of the runway slightly beyond the vertical plane of the pivot of the tilting frame including the arms 20 and rung 31, and that said tilting frame when swung upwardly and rearwardly, moves beyond the vertical plane of its pivot, as seen in Fig. 4, whereby the weight of the scoop which is hung from the tilting frame, will hold the parts in dumping position, with the scoop suspended in an inclined position and resting against the end of the platform 17, to hold the scoop in dumping position in an effective manner, and ready to slide back onto the platform and down the runway when the tilting frame is swung forwardly beyond the vertical plane of its pivot.

It will be understood that any suitable power may be employed for the operation of the cable as for example, horse power or motor power, and that after having positioned the receptacle or vehicle, the attention of the operator may be devoted to the guidance of the carrier or scoop in its movement toward the guide or runway of the loader. After the carrier or scoop has reached the lower end of the guide or runway, its further operation is conducted by the mechanism provided until the dumping of the contents thereof has been accomplished.

What is claimed is:—

A loading device embodying a frame having an inclined runway and a platform extending rearwardly from the upper end of said runway, an upwardly projecting tilting frame pivoted to the runway below the platform and normally swung forwardly, said tilting frame being swingable rearwardly beyond the vertical plane of its pivot, means for limiting the movement of said tilting frame when swung rearwardly beyond the plane of its pivot, a scoop movable up the runway and over the platform, the rear portion of the scoop and tilting frame having interengageable means for pivotally suspending the scoop from said frame, and flexible means connected to the forward portion of scoop for pulling the scoop up the runway and over the platform, said tilting frame, platform and scoop being so arranged, that when the scoop is pulled over the platform and suspended from the tilting frame when swung rearwardly beyond the vertical plane of its pivot, the scoop rests in an inclined position against the end of said platform to hold the scoop in inclined dumping position, ready for movement back to the platform and runway.

In testimony that I claim the foregoing as my own, I have hereto affixed my signature in the presence of two witnesses.

WILLIAM H. COMPTON.

Witnesses:
 EARL R. CONDER,
 ELIZABETH RAINEY.

Copies of this patent may be obtained for five cents each, by addressing the "Commissioner of Patents, Washington, D. C."